United States Patent
Taylor (10) Patent No.: US 11,810,727 B2
(45) Date of Patent: Nov. 7, 2023

(54) LATERAL TUNABLE DIELECTRIC VOLTAGE VARIABLE CAPACITOR

(71) Applicant: Troy Randall Taylor, Windham, NH (US)

(72) Inventor: Troy Randall Taylor, Windham, NH (US)

( * ) Notice: Subject to any disclaimer, the term of this patent is extended or adjusted under 35 U.S.C. 154(b) by 308 days.

(21) Appl. No.: 16/747,978

(22) Filed: Jan. 21, 2020

(65) Prior Publication Data

US 2021/0225596 A1   Jul. 22, 2021

(51) Int. Cl.
*H01G 7/06* (2006.01)

(52) U.S. Cl.
CPC ................. *H01G 7/06* (2013.01)

(58) Field of Classification Search
CPC .......................... H01L 29/93; H01L 28/55–57
See application file for complete search history.

(56) References Cited

U.S. PATENT DOCUMENTS

| | | | | |
|---|---|---|---|---|
| 2002/0051334 A1* | 5/2002 | Zhu | ........................ | H01G 7/06 361/311 |
| 2004/0241401 A1* | 12/2004 | Hunt | ................... | H01L 23/5223 428/209 |
| 2006/0125052 A1* | 6/2006 | Moon | ..................... | H01L 28/82 257/595 |
| 2008/0049375 A1* | 2/2008 | Lee | ......................... | H01G 7/06 361/301.3 |
| 2009/0141424 A1* | 6/2009 | Barth | ................... | H01L 27/0805 361/311 |
| 2018/0138262 A1* | 5/2018 | Chen | ................... | H01L 23/5223 |

* cited by examiner

Primary Examiner — Jay C Chang
Assistant Examiner — Mikka Liu (57) ABSTRACT

In this present invention lateral voltage variable capacitor designs are disclosed. The lateral voltage variable capacitor utilizes a dielectric material with an electric field dependent dielectric permittivity (dielectric constant). Variable capacitor structures are defined laterally in the plane of the substrate as opposed to vertical device structures defined out of the plane of the substrate.

5 Claims, 9 Drawing Sheets

FIGURE 6 terminal    finger

LATERAL TUNABLE DIELECTRIC VOLTAGE VARIABLE CAPACITOR

FIELD OF INVENTION

Present invention relates to variable capacitors, varactors, with a dielectric material that has an electric field dependent dielectric constant.

BACKGROUND

Capacitors are an essential fundamental building block in electronic devices and circuits. In its basic form a capacitor is two electrical conductors, metallic plates, or metallic surfaces separated by a dielectric medium. Common capacitor types in microelectronics include both parallel plate capacitors and interdigitated capacitors. Voltage variable capacitors or varactors can be produced by using a dielectric material with an electric field dependent dielectric permittivity (dielectric constant). A varactor can be capacitively tuned by changing the bias voltage across the capacitor. Voltage tunable capacitance is highly desirable as the added flexibility and functionality presents a significant cost benefit for microelectronic and semiconductor device technology. Varactors have many applications in devices and circuits including tunable filters, phase shifters, voltage-controlled oscillators, and impedance matching networks.

Electric field tunable dielectric materials can be used to produce variable capacitors. Candidate material systems include barium strontium titanate (BST), potassium tantalum niobate (KTN), silver tantalum niobate (ATN), lead zirconate titanate (PZT), and bismuth zinc niobate (BZN). The electric field dielectric tunability is an intrinsic material property of the material due to lattice dynamics. For BST in the paraelectric phase dielectric tunability is a result of soft mode phonon behavior while in the ferroelectric phase it is due to its ferroelectricity. Thin film deposition and semiconductor processing provides the capability of integrating tunable dielectrics and fabricating capacitors for varactor applications. Higher performing varactors are possible because tunable dielectric varactors have metal electrodes. Semiconductor diode varactors are PN junction devices that use semiconductor layers with higher resistivity values than metals and suffer high frequency roll off in quality factor.

Tunable dielectrics present an integration challenge for semiconductor processing and fabrication. Temperature requirements for tunable dielectric processing presents a significant compatibility issue with bottom electrode metallization in metal insulator metal (MIM) capacitor fabrication. Ideally tunable dielectrics require processing temperatures which exceed the melting point of high conductivity metals such as gold, silver, copper, and aluminum. Platinum is used for bottom electrode metallization although it has a high resistivity due to its relatively high melting temperature and since it does not oxidize under subsequent tunable dielectric processing conditions. High conductivity metals such as gold, silver, copper, and aluminum are not viable bottom electrode candidates as they degrade under the temperature conditions necessary to produce low dielectric loss in the tunable dielectric material. Tunable dielectric varactor performance suffers from the lack of a compatible high conductivity metal. Interdigitated capacitors can be used to avoid bottom electrode integration, but the trade-off is less electric field confinement in the tunable dielectric and thus higher voltages are required for tuning and operation. There is a need for new approaches to realize high performance tunable dielectric varactors. Accordingly, it would be beneficial for a less complicated and more metallization compatible device structure that maintains high field concentration in the tunable dielectric material. It is the objective of this present invention to provide such devices.

SUMMARY OF THE INVENTION

Present invention provides tunable dielectric devices for varactors that improve performance and overcome conventional limitations driven by either bottom electrode metallization or insufficient electric field confinement. Varactors are defined laterally in the plane of the substrate surface as opposed to conventional vertical varactors that are defined out of the plane of the substrate. The tunable dielectric and electrodes are on a substrate with the tunable dielectric layer sandwiched between two electrodes on opposite sides. There is no metallization under the tunable dielectric. The top surface of the electrodes and tunable dielectric are coplanar with no metal on the top dielectric surface. The electric field is confined in the tunable dielectric between the electrodes and capacitance is defined by the electrode separation and sidewall contact area. A varactor is defined laterally with the device structure having a left and right electrode as opposed to vertical integration with top and bottom electrodes. In another embodiment an interdigitated varactor is defined. A tunable dielectric material is on a substrate under the interdigitated electrodes and between the interdigitated fingers. The top surface of the interdigitated electrodes and tunable dielectric material between the interdigitated fingers are coplanar with no metal on the dielectric surface. Increased electric field confinement is achieved for the interdigitated varactor due to the tunable dielectric material between the interdigitated fingers. Both embodiments allow for improved varactor performance.

DETAILED DESCRIPTION OF THE DRAWINGS

Numerous details are set forth in the following description. The details include structures, components, materials, processing steps, and processing techniques. This is done to provide an understanding of the application. It will be appreciated by one of ordinary skill in the art that the present application may be practiced with viable alternative process options with these details. Well known structures and processing steps have not been described in detail to avoid obscuring the various embodiments of the present application. Drawings that accompany the present application are provided for illustrative purposes and are not drawn to scale.

The detailed description set forth below and illustrated is intended as a description of various configurations and practice and is not intended to represent the only configurations in which the described concepts may be practiced.

Figure 1:
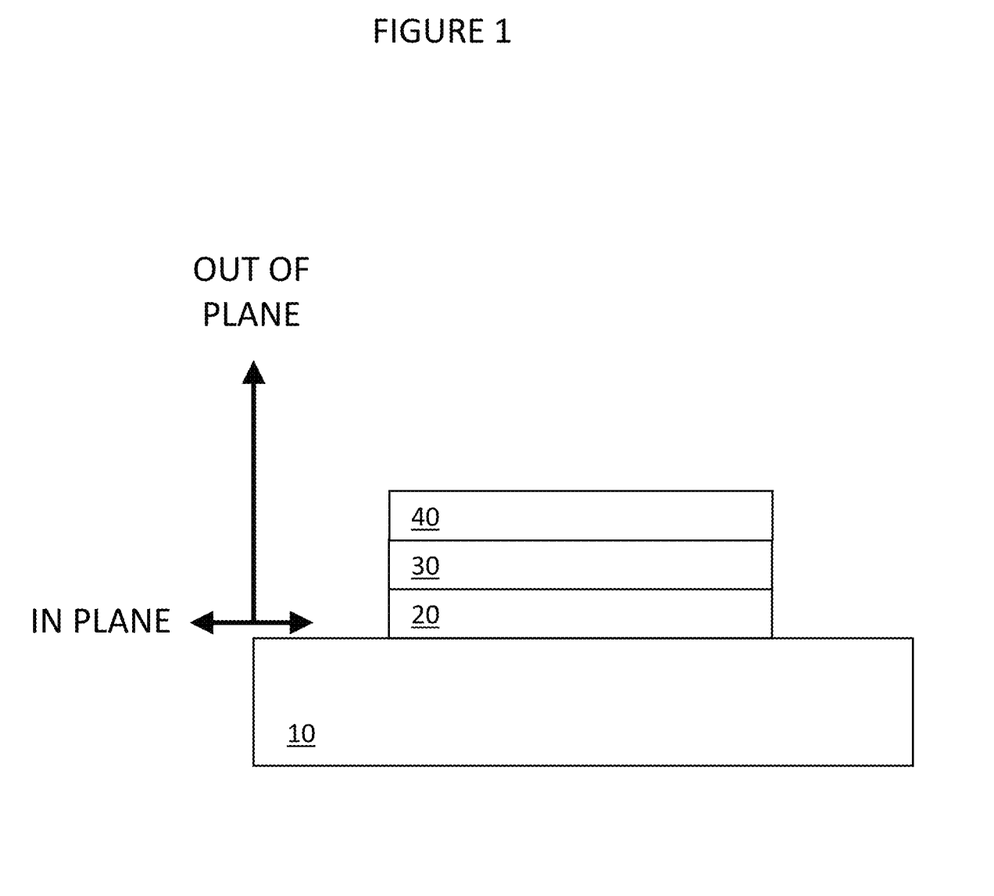
FIG. 1 is a cross sectional view of a conventional vertical varactor

FIG. 1 illustrates a conventional metal insulator metal (MIM) parallel plate varactor. The parallel plate varactor on a substrate 10 consists of a bottom electrode 20, a tunable dielectric layer 30, and a top electrode 40. The bottom electrode 20, tunable dielectric layer 30, and top electrode 40 are sequentially stacked layers on the substrate surface. The varactor is defined vertically out of the plane of the substrate surface. The individual layers of the varactor, bottom electrode 20, tunable dielectric layer 30, and top electrode 40 are oriented parallel with the substrate surface. Separation between the varactor conductive metal plates or electrodes (20,40) is determined by the thickness of the tunable dielectric layer 30. Capacitor area is defined lithographically by the formation of contacts from the bottom electrode 20 and top electrode 40. Capacitance for a vertical device structure ($C_{VERT}$) is defined by the permittivity of free space (e0), dielectric constant (K), contact area (Area) and tunable dielectric thickness ($t_{TD}$).

$$C_{VERT}=[e0K\text{Area}]/t_{TD}$$

A uniform and confined electric field is established between the electrodes (20,40) and in the tunable dielectric layer 30 with an applied bias. This conventional vertical approach requires a bottom electrode 20 between the tunable dielectric layer 30 and the substrate 10. Bottom electrode 10 formation precedes tunable dielectric layer 30 formation thus the bottom electrode must be compatible with tunable dielectric processing conditions to produce a functioning device. Conversely, compatibility requirements for the bottom electrode metal restrict the processing temperatures that can be applied for tunable dielectric processing.

Figure 2A:
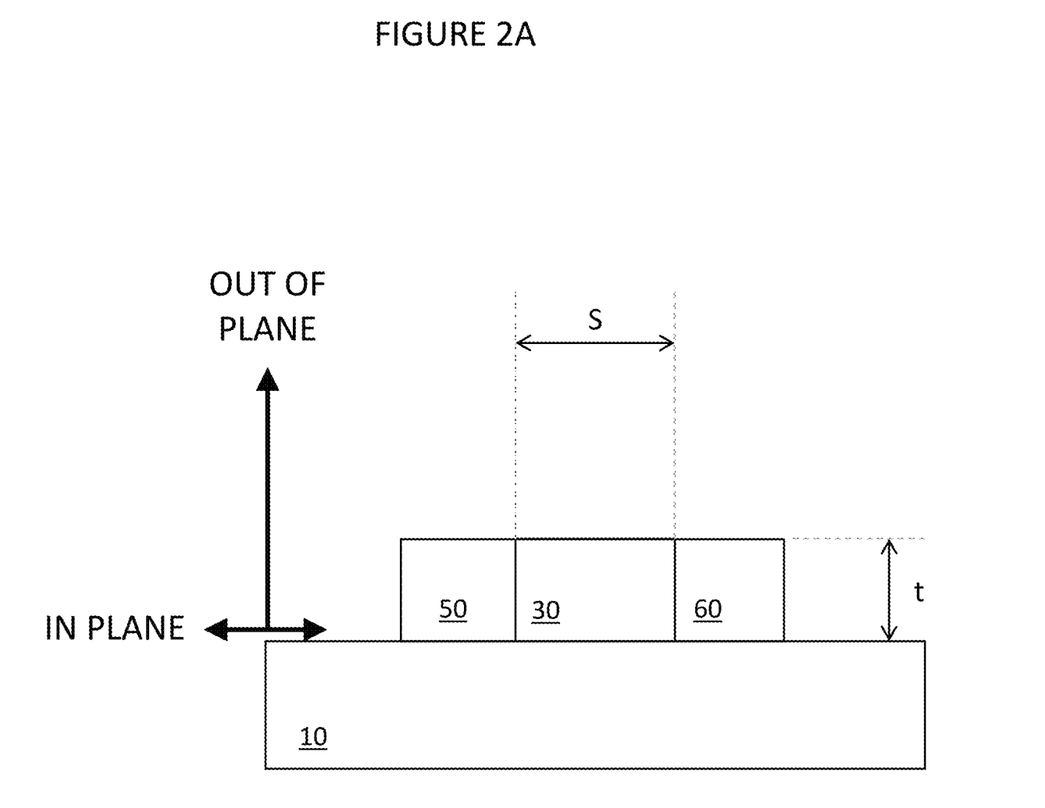
FIG. 2A is a cross sectional view of a lateral varactor

FIG. 2A illustrates a lateral MIM varactor on a substrate 10 comprised of a tunable dielectric layer 30, a left electrode 50, and a right electrode 60. The components (electrodes and tunable dielectric) of the lateral MIM varactor are oriented perpendicular to the substrate surface with the lateral device being defined in the plane of the substrate. The substrate 10 may comprise an insulating material or semiconducting material. The substrate may comprise of the following: magnesium oxide, alumina, sapphire, lanthanum aluminate, glass, quartz, aluminum nitride, any material classified as high temperature co-fired ceramic (HTCC), and any material classified as low temperature co-fired ceramic (LTCC). When the substrate is composed of a semiconductor material any of the following may be used: silicon, high resistivity silicon, silicon carbide, silicon on insulator, silicon germanium, germanium, gallium arsenide, gallium nitride, indium arsenide, indium phosphide, and other III/V or II/VI compound semiconductors.

The tunable dielectric layer 30 may comprise of a material with an electric field dependent dielectric permittivity such as but not limited to the following materials: barium strontium titanate (BST, $Ba_{1-x}Sr_xTiO_3$), potassium tantalum niobate (KTN, $KTa_{1-x}Nb_xO_3$), lead zirconium titanate (PZT, $PbZr_{1-x}Ti_xO_3$), silver tantalum niobate (ATN, $AgTa_{1-x}Nb_xO_3$), bismuth zinc niobate (BZN, $(Bi,Zn)_2(Zn,Nb)_2O_7$), or a combination thereof. The tunable dielectric material systems may also include small concentrations of one or more dopants for property modification. The left electrode 50 and right electrode 60 may comprise of a plurality of metal layers including but not limited to gold, silver, platinum, copper, aluminum, and alloys among others. Electrode separation is shown in FIG. 2A as "S" and for lateral varactors is defined by lithography, patterning, and microelectronic fabrication steps as opposed to by tunable dielectric film thickness for vertical devices. An applied voltage across the electrodes produces an electric field parallel with the electrode separation (S). Layer thickness is shown in FIG. 2A as "t", which defines tunable dielectric and electrode sidewall height for the lateral varactor. The top surfaces of the left electrode 50, tunable dielectric layer 30, and right electrode 60 are substantially coplanar with no metal on the top surface of the tunable dielectric layer 30. This ensures that with an applied voltage across the left electrode 50 and right electrode 60 there is a uniform and confined electric field between the two electrodes (50, 60) and in the tunable dielectric layer 30 to maximize electric field dependent dielectric tunability.

Figure 2B:
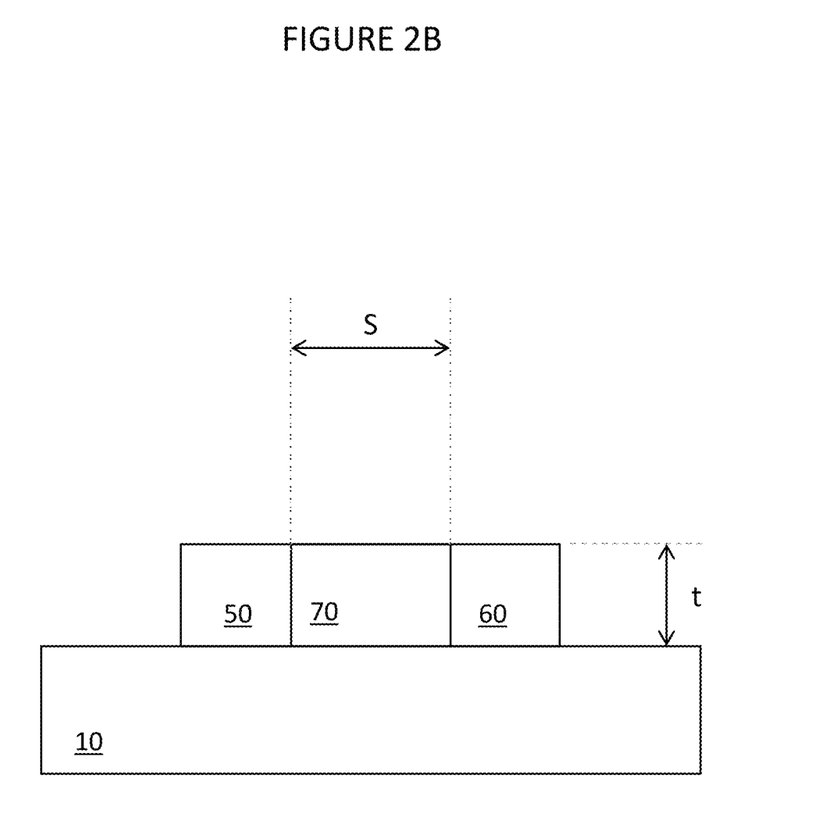
FIG. 2B is a cross sectional view of a lateral varactor with stacked dielectric layers

FIG. 2B illustrates a lateral varactor on a substrate comprised of a dielectric layer 70 between a left electrode 50 and a right electrode 60. The dielectric layer 70 is a plurality of dielectric layers with a tunable dielectric layer and other dielectric layers such as fluorides, nitrides, oxides, and oxy-nitrides among others. Layer 70 may include multiple tunable dielectric layers. Layer 70 may include a layer or layers under the tunable dielectric layer, on top of the dielectric layer, or both. A layer or layers between the substrate and dielectric layer can be used for interface control, film growth control, epitaxy, texture control, or as diffusion barriers. A layer or layers on top of the tunable dielectric layer can be used for passivation, masking, and for an etch stop. Layer or layers could also be used as spacers to adjust the position of the tunable dielectric between the electrodes. The top surfaces of the dielectric layer 70, left electrode 50, and right electrode 60 are substantially coplanar with no metal on the top surface of the dielectric layer 70. This ensures that with an applied voltage across the electrodes there is a uniform and confined electric field between the two electrodes and in the dielectric layer 70.

Figure 3A:
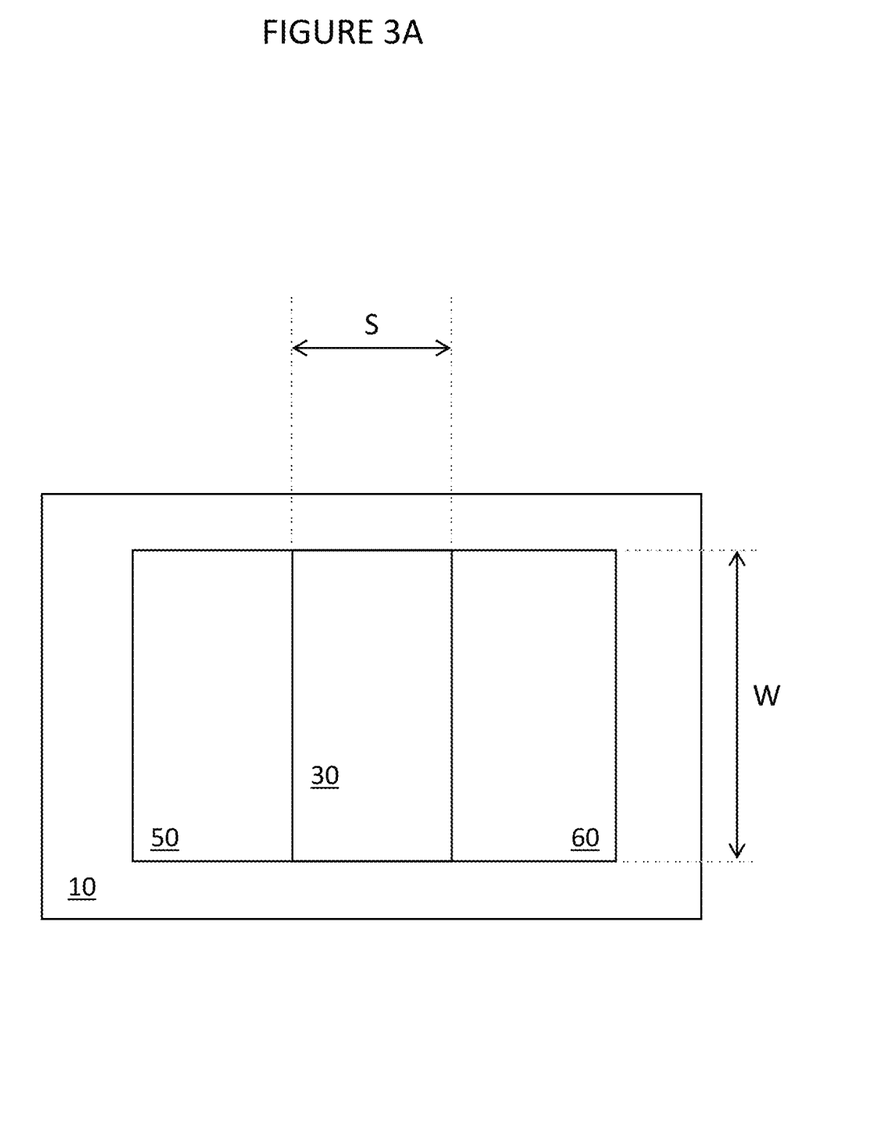
FIG. 3A is a top view of a lateral varactor
Figure 3B:
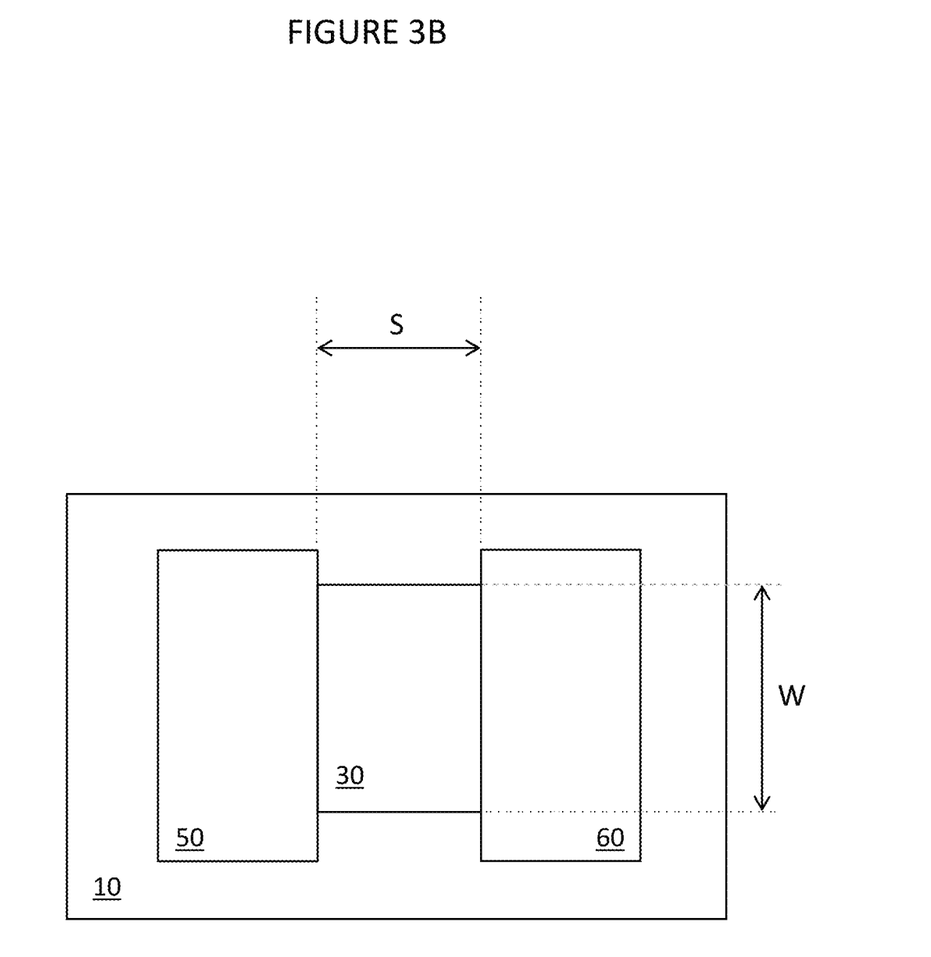
FIG. 3B is a top view of a lateral varactor
Figure 3C:
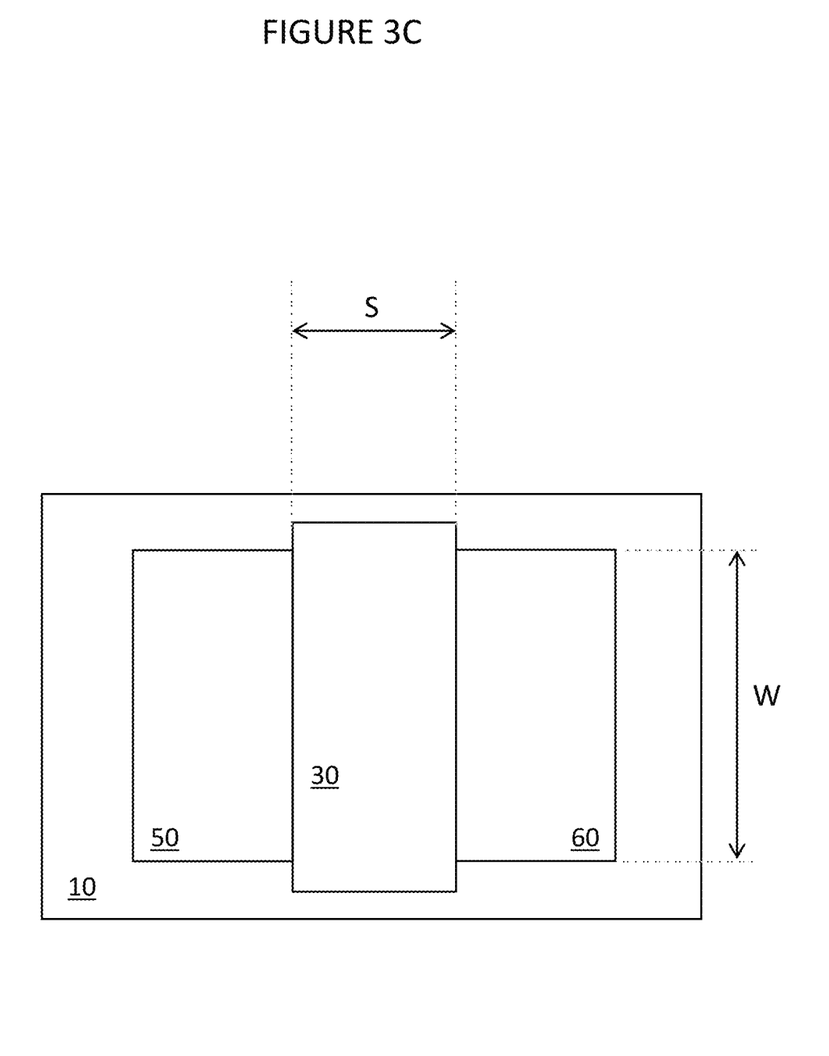
FIG. 3C is a top view of a lateral varactor

FIGS. 3A thru 3C illustrate the top view of the lateral varactor on a substrate 10, with a tunable dielectric layer 30, a left electrode 50, and a right electrode 60. For illustrative purposes only the tunable dielectric layer 30 is depicted, although dielectric layer 70 could be interchanged with the tunable dielectric layer 30. Electrode separation is depicted as "S" and device width is depicted as "W". Both "S" and "W" are produced by lithography, patterning, and microelectronic fabrication steps. Device width (W) is perpendicular to the electric field produced between the left electrode 50 and right electrode 60 with an applied bias. Sidewall area defined by the product of device width (W) and total layer thickness (t) determines the capacitor area for the capacitor. Capacitance for a lateral device ($C_{LAT}$) structure is given by, $$C_{LAT}=[e0KWt]/S$$

FIG. 3A displays tunable dielectric 30 and electrodes (50, 60) of equal width. FIG. 3B displays a less wide tunable dielectric layer 30. FIG. 3C displays smaller width electrodes (50,60). Device width (W) is determined by the smallest width amongst the left electrode 50, tunable dielectric layer 30, and right electrode 60. Symmetric electrodes are shown in FIGS. 3A through 3C but depending on layout and device design equally sized electrodes are not a requirement.

Standard integrated circuit and microelectronic fabrication methods may be used for varactor fabrication. Fabrication steps include deposition, lithography, etching, annealing, and planarization among others. Deposition techniques for dielectrics, metallization, and tunable dielectrics may include physical vapor deposition, chemical vapor deposition, molecular beam epitaxy, liquid phase epitaxy, atomic layer deposition, spin on methods, sol gel, spay methods, and chemical solution deposition. Lateral varactor formation processes have tunable dielectric formation followed by metal formation. This enables tunable dielectric formation independent of metallization and any potential constraints due to any metal layers or material. Higher temperature processes can be used to produce higher quality tunable dielectric material such as lower loss tangent, higher dielectric constant, and improved electric field dielectric tunability.

Figure 4:
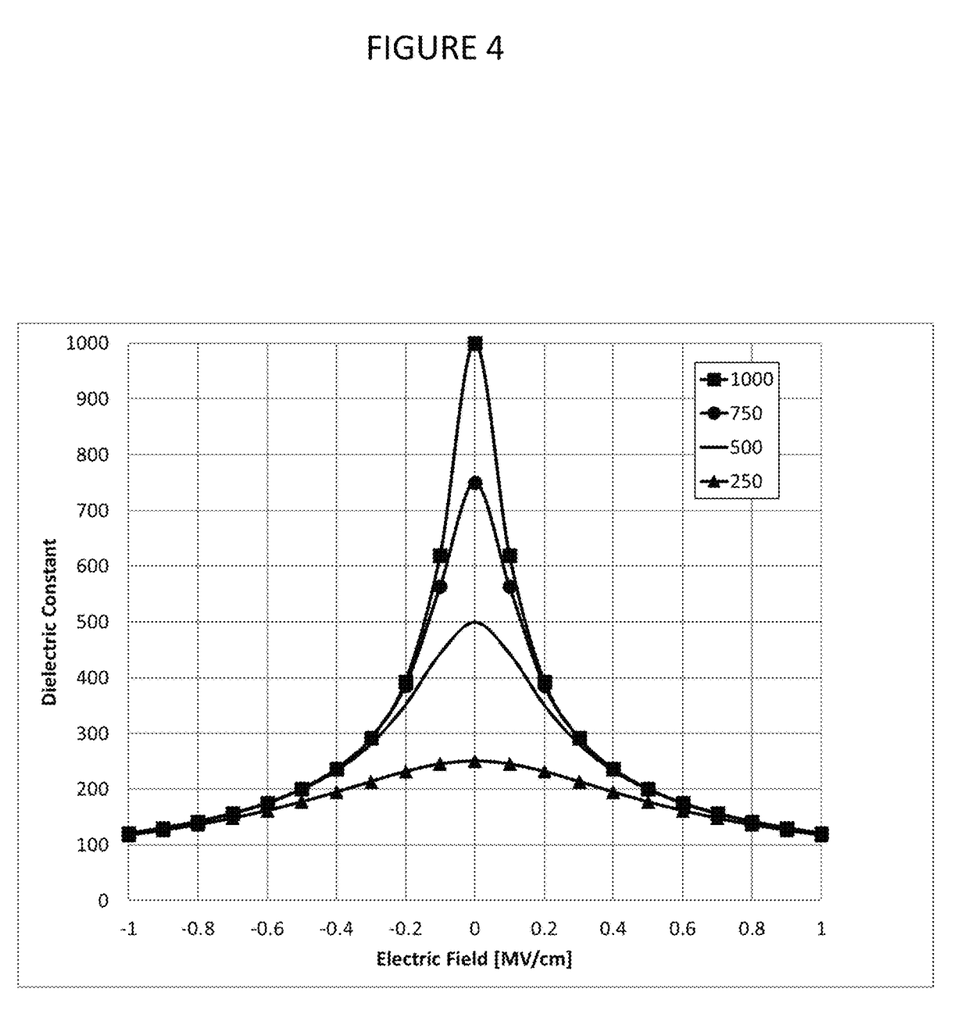
FIG. 4 is a plot of dielectric constant as a function of electric field (MV/cm) for a zero bias dielectric constant of 1000, 750, 500, and 250
Figure 5:
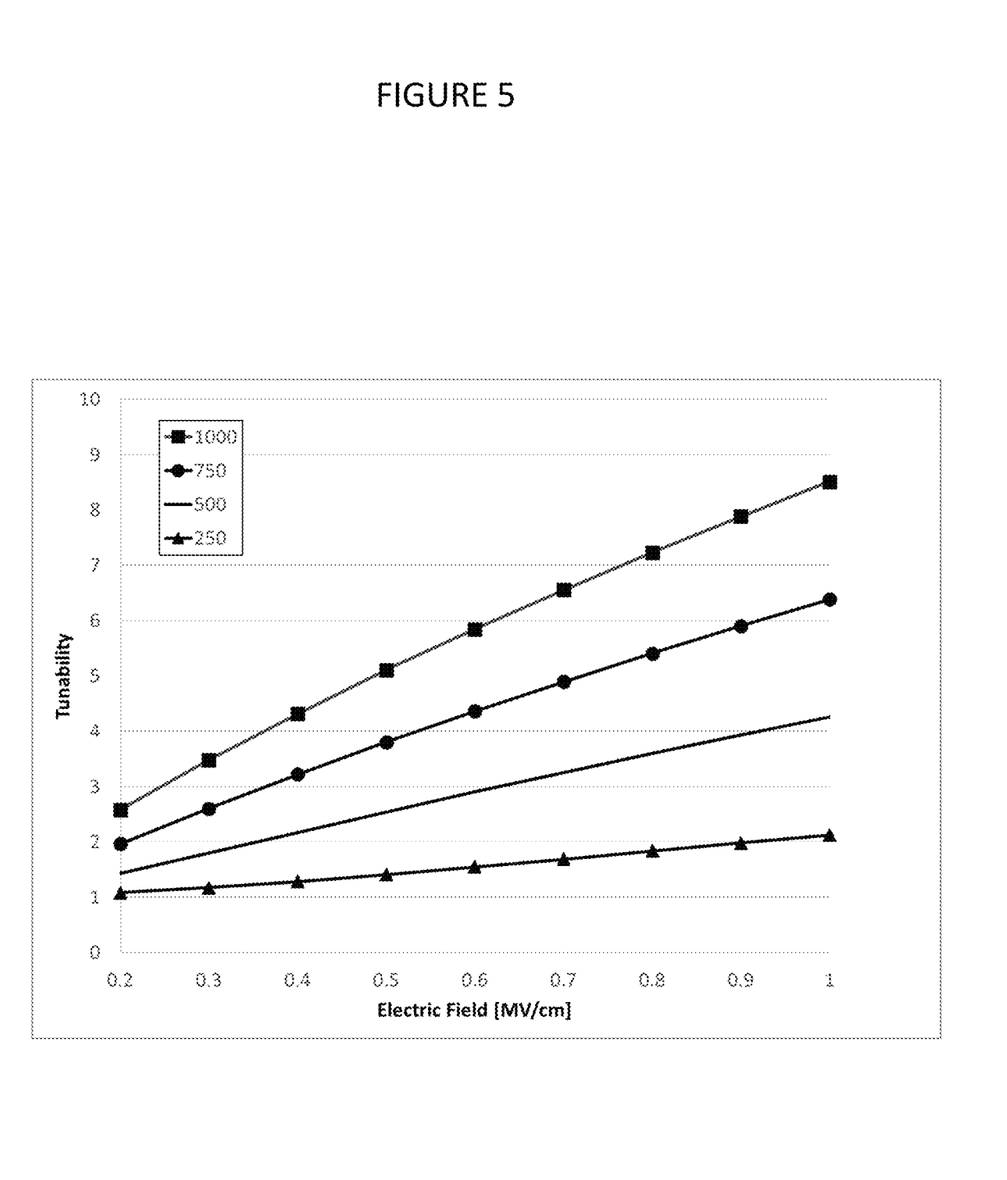
FIG. 5 is a plot of tuning ratio as a function of electric field for a parallel plate capacitor with zero bias dielectric constant of 1000, 750, 500, and 250

Dielectric constant for tunable dielectric materials is dependent on numerous variables including composition, tunable dielectric film thickness, processing temperature, microstructure, and substrate material. For tunable dielectric material with the perovskite structure ($ABO_3$), the ratio of different A site cations, and the ratio of A to B site cations impacts dielectric properties. Thicker films and higher processing temperatures have shown the trend of higher dielectric constants. Tensile film strain which manifests from thermal expansion mismatch with the substrate has been shown to reduce dielectric constant in tunable dielectric films. Film microstructure, polycrystalline or epitaxial, plays an impactful role in determining film dielectric properties. Tunable dielectric material dielectric constant values typically range from 200 to 2000. FIG. 4 illustrates modeled dielectric constant as a function of applied electric field for zero bias dielectric constants of 250, 500, 750, and 1000. FIG. 5 illustrates the relationship of tunability as a function of applied electric field for zero bias dielectric constants of 250, 500, 750, and 1000. Tunability is defined as the ratio of dielectric constant at zero bias (no electric field) divided by dielectric constant at an applied electric field.

Lateral varactor electrode separation (S) and voltage requirements can be determined from FIG. 4 and FIG. 5 for lateral varactors. For a tunable dielectric film with a maximum zero bias dielectric constant of 500 and an electrode separation of 1 micron, 2:1 tunability and 3:1 tunability are achieved at 0.36 MV/cm (36 V) and 0.65 MV/cm (65V) respectively. Reducing the electrode separation to 0.5 microns reduces the voltage requirement by half. A tunable dielectric film with a maximum zero bias dielectric constant of 1000 and an electrode separation of 1 micron, 4:1 tunability and 5:1 tunability are achieved at 0.36 MV/cm (36 V) and 0.5 MV/cm (50V) respectively. Reducing the electrode separation to 0.5 microns would then cut the voltage requirements to 18.5 volts and 25 volts. Reducing electrode separation increases capacitance or capacitance could be kept constant with a change in sidewall area by changing device width or film thickness. The mentioned voltages ranging upwards of 65V are realistic voltages as microwave and RF systems incorporate higher system voltages for gallium nitride devices. Integration with high voltage devices and systems from 600 to 1500 volts for example would require larger electrode separation values in the 1 to 10 microns range with similar micron thickness range values as well.

Figure 6:
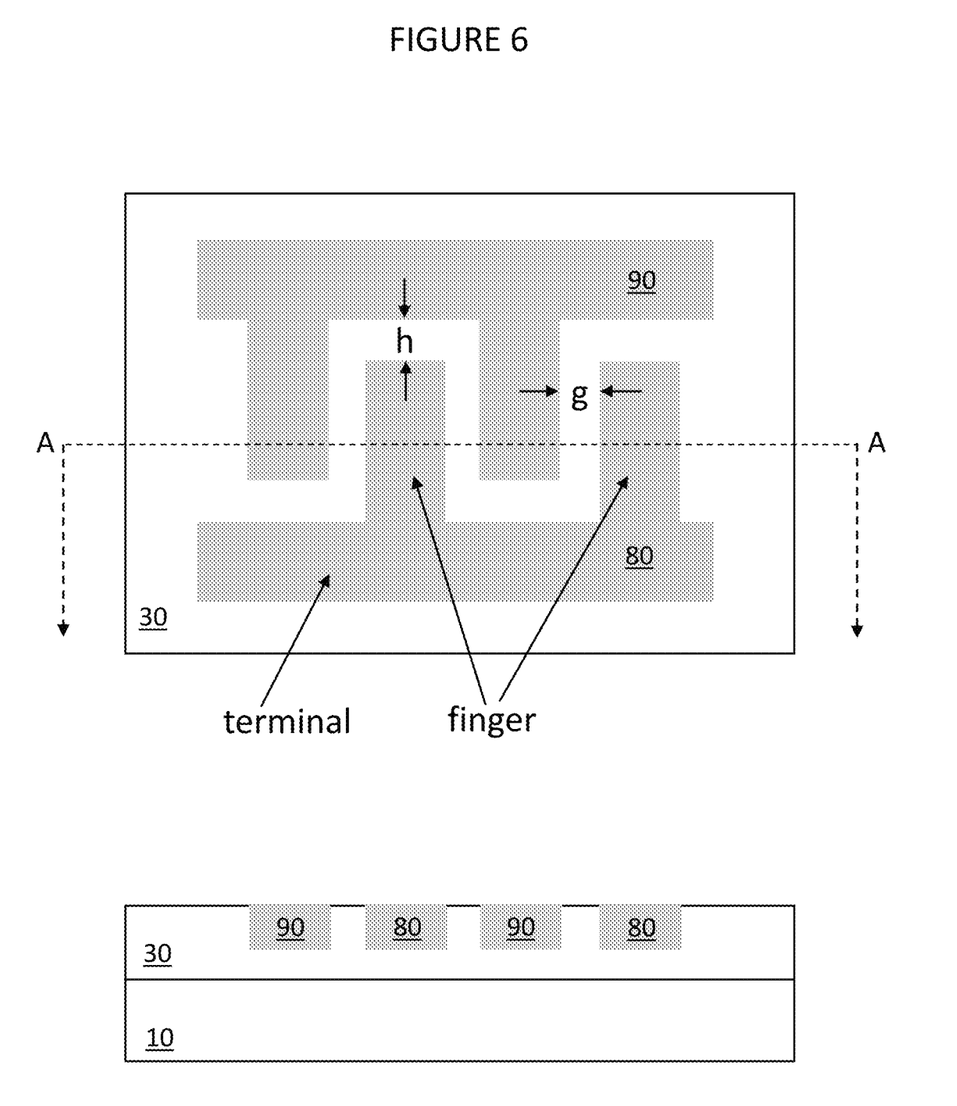
FIG. 6 is a top view of interdigitated varactor and a cross sectional view along A-A

In another embodiment, an interdigitated variable capacitor has improved electric field confinement in the tunable dielectric material. FIG. 6 illustrates an interdigitated variable capacitor. A tunable dielectric layer 30 is on a substrate 10 with a first interdigitated metal electrode 80 and a second interdigitated metal electrode 90. The interdigitated metal electrodes (80, 90) consist of a terminal with a set of fingers and are labeled on the first metal electrode 80 in FIG. 6. The fingers of the first metal electrode 80 and the fingers of the second metal electrode 90 are interdigitated. The electrode finger separation is designated as "g" while the separation at the end of the finger between the terminal is designated as "h". Both "g" and "h" represent separation distances between the metal electrodes and for interdigitated capacitors the separation is generally referred to as gaps and filled with air. The tunable dielectric layer 30 fills the gap that separates both interdigitated metal electrodes (80,90). Gap sizes similar to previously discussed electrode separation distances as discussed with FIG. 4 and FIG. 5 are desirable. The electric field between the interdigitated fingers is now confined in the tunable dielectric material 30. The top surfaces of the first metal electrode 80, second metal electrode 90, and tunable dielectric layer between the interdigitated electrodes are substantially coplanar. No metal is on the top surface of the tunable dielectric layer between the interdigitated electrodes. In addition to being between the interdigitated electrodes, the tunable dielectric layer 30 is under the interdigitated electrodes.

Various modifications may be made to the illustrated embodiments without departing from the spirit and scope of the invention. Although the sidewall of the dielectric layer 30 is shown as vertical in the figures, the sidewall may have an angle. With a sidewall angle; the electrode separation will change through the thickness of the dielectric. The lateral varactor is shown directly on a substrate 10 for convenience. Other layers and structures can be located between the lateral varactor and the substrate 10. Dielectric layers and metal electrodes may consist of multiple layers. Additional layers may be used for various purposes according to conventional techniques such as to increase adhesion, provide a diffusion barrier, as passivation layers, encapsulation, or to improve electrical contact characteristics with the tunable dielectric material such as Schottky barrier height. Subsequent steps following planarization may remove or remove and replace dielectric layers on top of the tunable dielectric. Interdigitated capacitor gaps may vary through the capacitor structure. Dielectric tunability may vary from modeled behavior and maximum dielectric constant may be offset from zero volts. Additional modifications will become apparent to one of ordinary skill in the art. It is therefore intended that the present application not be limited to the exact forms and details described and illustrated, but fall within the scope of the claims.

What is claimed:

1. An interdigitated variable capacitor on a substrate comprising:
   a tunable dielectric layer on the substrate;
   no metal electrodes under the tunable dielectric layer;
   a first interdigitated metal electrode and a second interdigitated metal electrode such that the tunable dielectric layer is under the interdigitated electrodes and in a gap between the interdigitated electrodes;
   no tunable dielectric on the top surfaces of the first and second interdigitated metal electrodes;
   no metal on the top surface of the tunable dielectric layer in the gap between the interdigitated electrodes;
   the top surfaces of the first interdigitated metal electrode, the second interdigitated metal electrode, and the tunable dielectric layer in the gap between the interdigitated electrodes are coplanar.

2. The interdigitated variable capacitor of claim 1 wherein the gap between interdigitated metal electrodes is less than 5 microns.

3. The interdigitated variable capacitor of claim 1 wherein the tunable dielectric layer includes a material from a list containing barium titanate, barium strontium titanate, strontium titanate, potassium niobate, potassium tantalum niobate, potassium tantalate, lead titanate, lead zirconium titanate, lead zirconate, silver niobate, silver tantalum niobate, silver tantalate, and bismuth zinc niobate.

4. The interdigitated variable capacitor of claim 1 wherein the tunable dielectric layer is a ferroelectric material.

5. The interdigitated variable capacitor of claim 1 wherein the tunable dielectric layer is a paraelectric material.

* * * * *